(12) United States Patent
Liu et al.

(10) Patent No.: US 12,253,456 B2
(45) Date of Patent: Mar. 18, 2025

(54) MICROFLUIDIC DETECTION DEVICE (71) Applicant: AUO Corporation, Hsinchu (TW)

(72) Inventors: Shu-Jiang Liu, Hsinchu (TW);
Chun-Cheng Hung, Hsinchu (TW);
Wen-Jen Li, Hsinchu (TW); Zhi-Jain
Yu, Hsinchu (TW); Han-Chung Lai,
Hsinchu (TW)

(73) Assignee: AUO Corporation, Hsinchu (TW)

( * ) Notice: Subject to any disclaimer, the term of this patent is extended or adjusted under 35 U.S.C. 154(b) by 183 days.

(21) Appl. No.: 18/072,655

(22) Filed: Nov. 30, 2022

(65) Prior Publication Data
US 2024/0044776 A1 Feb. 8, 2024

(30) Foreign Application Priority Data

Aug. 2, 2022 (TW) .................................. 111128888

(51) Int. Cl.
G01N 21/03 (2006.01)
B01L 3/00 (2006.01)
G02B 6/43 (2006.01)

(52) U.S. Cl.
CPC .... *G01N 21/0303* (2013.01); *B01L 3/502715* (2013.01); *G02B 6/43* (2013.01);
(Continued)

(58) Field of Classification Search
CPC ............... G01N 21/6428; G01N 21/05; G01N 2021/6439; G01N 21/6456; G01N 21/6486; G01N 21/6454; G01N 21/6452; G01N 2021/0346; G01N 21/64; G01N 21/75; G01N 2021/6421; G01N 2201/061; G01N 21/8483; G01N 27/44721; G01N 21/645;
(Continued)

(56) References Cited

U.S. PATENT DOCUMENTS 5,858,195 A 1/1999 Ramsey
6,001,229 A 12/1999 Ramsey
(Continued)

FOREIGN PATENT DOCUMENTS

CN 1052301 5/2000
CN 107607475 A * 1/2018 ........ B01L 3/502715
(Continued)

*Primary Examiner* — Michael P Stafira
(74) *Attorney, Agent, or Firm* — JCIPRNET (57) ABSTRACT Disclosed is a microfluidic detection device including a circuit substrate and a transparent substrate. The circuit substrate is provided with at least one first light-emitting device used to emit a detection beam, a photodetector used to receive the detection beam and send out a sensing signal, and a control circuit electrically connected to the first light-emitting device and the photodetector. The transparent substrate overlaps the circuit substrate and is provided with a microfluidic channel and a light guide structure. The light guide structure has a light incident surface disposed corresponding to the first light-emitting device and a light exiting surface disposed corresponding to the photodetector. The light guide structure extends from each of the light incident surface and the light exiting surface to the microfluidic channel and is adapted to transmit the detection beam into and out of the microfluidic channel.

11 Claims, 7 Drawing Sheets (52) U.S. Cl.
CPC ........... *G01N 2201/0668* (2013.01); *G01N 2201/0873* (2013.01)

(58) Field of Classification Search
CPC ........... G01N 21/76; G01N 2015/1006; G01N 15/1484; G01N 2021/0325; G01N 21/0303; G01N 2021/6482; G01N 21/255; G01N 21/31; G01N 15/1433; G01N 21/6458; G01N 21/648; G01N 15/1429; G01N 15/1436; G01N 2021/6441; G01N 2021/6471; G01N 15/147; G01N 33/542; G01N 2021/7786; G01N 21/763; G01N 2333/726; G01N 2333/90241; G01N 33/48; G01N 33/5308; G01N 33/54366; G01N 33/581; G01N 2201/062; G01N 33/53; G01N 21/01; G01N 21/03; G01N 35/00029; G01N 15/149; G01N 2021/6432; G01N 2035/00237; G01N 2201/0221; G01N 2201/08; G01N 27/403; G01N 15/1404; G01N 2021/0328; G01N 2035/00752; G01N 2035/00811; G01N 2035/00851; G01N 21/25; G01N 2201/0627; G01N 35/00069; G01N 35/00732; G01N 2015/1402; G01N 2035/00158; G01N 33/54373; G01N 15/1459; G01N 2015/145; G01N 2035/00148; G01N 2035/00168; G01N 21/253; G01N 2015/144; G01N 27/44791; G01N 33/56972; G01N 2021/052; G01N 2021/6463; G01N 21/07; G01N 21/6402; G01N 2201/0873; G01N 35/0098; G01N 2015/1497; G01N 2021/752; G01N 21/59; G01N 21/77; G01N 21/7703; G01N 33/582; G01N 1/28; G01N 2021/7783; G01N 21/27; G01N 15/1434; G01N 2021/757; G01N 21/031; G01N 21/0332; G01N 21/11; G01N 2201/024; G01N 33/54306; G01N 2015/1486; G01N 2021/058; G01N 2201/0612; G01N 2201/0638; G01N 33/4915; G01N 33/5005; G01N 15/00; G01N 2021/6419; G01N 2021/7763; G01N 21/7746; G01N 21/85; G01N 2201/0228; G01N 33/57492; G01N 15/06; G01N 2021/0106; G01N 2035/00495; G01N 21/6408; G01N 2201/0636; G01N 2201/068; G01N 2458/40; G01N 27/4145; G01N 27/44743; G01N 33/537; G01N 33/585; G01N 33/587; G01N 15/0205; G01N 15/042; G01N 15/05; G01N 15/075; G01N 2015/1454; G01N 2021/056; G01N 2021/4711; G01N 2021/513; G01N 2021/6484; G01N 2021/8405; G01N 2201/0635; G01N 2201/064; G01N 27/44726; G01N 30/6095; G01N 33/28; G01N 33/2847; G01N 33/52; G01N 33/5302; G01N 33/54353; G01N 33/545; G01N 33/561; G01N 33/6845; G01N 33/92; G01N 35/00; G01N 35/08; G01N 35/10; G01N 2015/012; G01N 2015/016; G01N 2015/018; G01N 2021/0112; G01N 2021/6434; G01N 2021/7736; G01N 21/553; G01N 2201/0415; G01N 2201/06113; G01N 2201/067; G01N 2201/0696; G01N 27/226; G01N 27/414; G01N 30/72; G01N 30/7233; G01N 30/724; G01N 30/7266; G01N 33/54313; G01N 33/56966; G01N 33/56983; G01N 1/40; G01N 1/4005; G01N 1/4077; G01N 2001/4016; G01N 2001/4088; G01N 2015/1028; G01N 2015/1472; G01N 2015/1477; G01N 2021/458; G01N 2021/6478; G01N 2021/7723; G01N 2035/00207; G01N 2035/00366; G01N 2035/00376; G01N 2035/00445; G01N 2035/00475; G01N 21/29; G01N 21/45; G01N 21/47; G01N 21/63; G01N 21/643; G01N 21/6489; G01N 21/65; G01N 21/84; G01N 21/94; G01N 2201/0461; G01N 2201/0628; G01N 2333/11; G01N 27/44704; G01N 33/2882; G01N 33/49; G01N 33/491; G01N 33/492; G01N 33/5008; G01N 33/533; G01N 33/54346; G01N 33/5438; G01N 35/00594; G01N 1/2035; G01N 1/2042; G01N 1/38; G01N 15/01; G01N 15/1023; G01N 15/1031; G01N 15/14; G01N 15/1492; G01N 2015/0038; G01N 2015/019; G01N 2015/1027; G01N 2015/1481; G01N 2015/1488; G01N 2021/3185; G01N 2021/6417; G01N 2021/7759; G01N 2021/8835; G01N 2030/025; G01N 2030/528; G01N 2035/1034; G01N 21/17; G01N 21/274; G01N 21/276; G01N 21/314; G01N 21/6445; G01N 21/658; G01N 21/78; G01N 21/8806; G01N 2201/0222; G01N 2201/0642; G01N 2201/0668; G01N 23/043; G01N 23/046; G01N 23/20; G01N 2333/165; G01N 2333/195; G01N 2333/245; G01N 2333/31; G01N 2333/32; G01N 2333/33; G01N 2333/70596; G01N 2400/10; G01N 2400/50; G01N 27/221; G01N 27/4473; G01N 27/44773; G01N 30/60; G01N 30/6004; G01N 30/6069; G01N 30/64; G01N 33/00; G01N 33/483; G01N 33/48785; G01N 33/50; G01N 33/5014; G01N 33/5047; G01N 33/505; G01N 33/5088; G01N 33/543; G01N 33/558; G01N 33/56911; G01N 33/56916; G01N 33/56938; G01N 33/57484; G01N 33/579; G01N 33/58; G01N 33/6863; G01N 33/6893; G01N 35/04; G01N 35/1009; G01N 35/1016; G01N 35/1065; G01N 35/1097; G01N 7/10; G02B 21/16; G02B 21/36; G02B 6/4215; G02B 5/20; G02B 5/22; G02B 6/0008; G02B 6/0026; G02B 6/29368; G02B 2006/12107; G02B 6/124; G02B 2006/12138; G02B 21/361; G02B 27/4233; G02B 6/0036; G02B 6/0068; G02B 6/122; G02B 1/06; G02B 1/115; G02B 21/06; G02B 6/10; G02B 6/13; G02B 2006/0325; G02B 2006/121; G02B 23/2469; G02B 23/26; G02B 6/0038; G02B 6/0048; G02B 6/005; G02B 6/0053; G02B 6/0078; G02B 6/032; G02B 6/12004; G02B 6/12007; G02B 6/1226; G02B 6/1228; G02B 6/125; G02B 6/305; G02B 6/3636; G02B 6/3644; G02B 6/3652; G02B 6/3688; G02B 6/3692; G02B 6/3696; G02B 21/0008; G02B 21/02; G02B 3/08; G02B 3/12; G02B 3/14; G02B 5/02; G02B 6/12; G02B 6/1221; G02B 6/138; G02B 6/255; G02B 6/34; G02B 6/4214; G02B 9/04; G02B 1/002; G02B 1/041; G02B 1/111; G02B 19/0028; G02B 2003/0093; G02B 2006/12069; G02B 2006/12071; G02B 2006/12114; G02B 2006/12121; G02B 2006/12123; G02B 2006/12173; G02B 21/082; G02B 21/26; G02B 21/30; G02B 21/32; G02B 21/34; G02B 2207/101; G02B 26/005; G02B 27/0994; G02B 27/1006; G02B 27/141; G02B 27/145; G02B 27/44; G02B 5/04; G02B 5/1852; G02B 5/201; G02B 6/02033; G02B 6/02295; G02B 6/02385; G02B 6/107; G02B 6/12002; G02B 6/12011; G02B 6/12014; G02B 6/12019; G02B 6/4202; G02B 6/4204; G02B 6/43; B01L 3/502715; B01L 2300/0816; B01L 2300/0654; B01L 3/5027; B01L 7/52; B01L 3/502707; B01L 2300/0636; B01L 3/50273; B01L 2300/0663; B01L 2400/0487; B01L 2300/0877; B01L 2300/1827; B01L 2200/10; B01L 2300/0864; B01L 2300/0867; B01L 3/502761; B01L 2300/0645; B01L 3/502738; B01L 2300/0887; B01L 2400/0406; B01L 2300/1822; B01L 2200/025; B01L 2300/0627; B01L 2200/027; B01L 9/527; B01L 2400/0409; B01L 2300/0874; B01L 2400/0481; B01L 2200/026; B01L 2200/0647; B01L 2300/0861; B01L 2400/0415; B01L 2300/12; B01L 3/502746; B01L 2300/0819; B01L 2300/168; B01L 2400/0655; B01L 2400/086; B01L 3/502; B01L 3/502784; B01L 7/00; B01L 2400/0442; B01L 2200/147; B01L 2300/02; B01L 2300/042; B01L 2200/0673; B01L 2200/16; B01L 2300/123; B01L 2300/1805; B01L 3/502753; B01L 2300/0806; B01L 2300/0896; B01L 2300/1838; B01L 2400/0677; B01L 2400/088; B01L 3/508; B01L 2300/087; B01L 2300/0883; B01L 2300/161; B01L 2200/0631; B01L 2300/0803; B01L 2300/1861; B01L 2400/0427; B01L 2200/06; B01L 2200/12; B01L 2300/0681; B01L 2300/16; B01L 3/502792; B01L 7/525; B01L 9/00; B01L 2200/0652; B01L 2200/0663; B01L 2300/0893; B01L 2300/1833; B01L 3/0268; B01L 7/54; B01L 2200/0689; B01L 2300/046; B01L 2300/165; B01L 2400/0457; B01L 2400/0493; B01L 2200/0605; B01L 2300/0851; B01L 2400/0424; B01L 2400/084; B01L 3/5085; B01L 2400/0421; B01L 3/00; B01L 3/5025; B01L 3/502723; B01L 2200/0621; B01L 2300/021; B01L 2300/069; B01L 2300/0829; B01L 2300/0832; B01L 2400/06; B01L 3/0293; B01L 3/502776; B01L 3/565; B01L 2200/0642; B01L 2200/0684; B01L 2300/06; B01L 2300/0809; B01L 2300/18; B01L 2300/1894; B01L 2400/0638; B01L 2400/0688; B01L 2200/0636; B01L 2200/0668; B01L 2200/141; B01L 2200/142; B01L 2200/143; B01L 2300/0822; B01L 2300/14; B01L 2300/1883; B01L 2400/0475; B01L 2400/0633; B01L 3/06; B01L 3/502769; B01L 3/563; B01L 3/5635; B01L 7/5255; B01L 2200/14; B01L 2300/0858; B01L 2300/088; B01L 2300/185; B01L 2400/0605; B01L 2400/082; B01L 3/50851; B01L 3/50857; B01L 3/54; B01L 3/56; B01L 7/02; B01L 2200/0694; B01L 2300/0825; B01L 2300/163; B01L 2400/0439; B01L 2400/0472; B01L 2400/049; B01L 2400/0622; B01L 2400/0694; B01L 3/5082

See application file for complete search history.

(56) References Cited

U.S. PATENT DOCUMENTS

| | | | |
|---|---|---|---|
| 6,010,607 | A | 1/2000 | Ramsey |
| 6,010,608 | A | 1/2000 | Ramsey |
| 6,033,546 | A | 3/2000 | Ramsey |
| 6,342,142 | B1 | 1/2002 | Ramsey |
| 6,469,785 | B1 | 10/2002 | Duveneck et al. |
| 6,475,363 | B1 | 11/2002 | Ramsey |
| 8,541,168 | B1 * | 9/2013 | Wohlstadter ........... G01N 21/76 |
| | | | 435/6.11 |
| 11,175,467 | B2 | 11/2021 | Meng et al. |
| 2002/0008030 | A1 | 1/2002 | Ramsey |
| 2003/0150733 | A1 | 8/2003 | Ramsey |
| 2003/0205469 | A1 | 11/2003 | Ramsey |
| 2003/0205470 | A1 | 11/2003 | Ramsey |
| 2003/0226753 | A1 | 12/2003 | Ramsey |
| 2003/0226755 | A1 | 12/2003 | Ramsey |
| 2004/0007464 | A1 | 1/2004 | Ramsey |
| 2004/0009517 | A1 | 1/2004 | Ramsey |
| 2004/0115861 | A1 * | 6/2004 | Wong ................. B81C 1/00492 |
| | | | 438/102 |
| 2004/0137445 | A1 | 7/2004 | Ramsey |
| 2010/0152066 | A1 * | 6/2010 | Malik ................ G01N 21/6428 |
| | | | 165/185 |
| 2020/0233158 | A1 * | 7/2020 | Meng .................. G01N 21/274 |
| 2021/0229096 | A1 * | 7/2021 | Lin ................... B01L 3/502792 |
| 2021/0354128 | A1 * | 11/2021 | Meng ..................... G01N 21/31 |

FOREIGN PATENT DOCUMENTS

| | | | | |
|---|---|---|---|---|
| CN | 109632660 | | 4/2019 | |
| CN | 109632660 | A * | 4/2019 | ............ B01L 3/5027 |
| CN | 107607475 | B * | 5/2020 | ........ B01L 3/502715 |
| CN | 108956467 | B * | 4/2022 | ............. G01N 21/01 |
| EP | 3299800 | A1 * | 3/2018 | ........ B01L 3/502715 |
| JP | 2000516719 | A * | 12/2000 | |
| JP | 2004333250 | A * | 11/2004 | ............... C12Q 1/00 |
| WO | WO-2011136265 | A1 * | 11/2011 | ............. G01N 21/07 |
| WO | WO-2019228035 | A1 * | 12/2019 | ........ B01L 3/502715 |

* cited by examiner

MICROFLUIDIC DETECTION DEVICE

CROSS-REFERENCE TO RELATED APPLICATION

This application claims the priority benefit of Taiwanese application no. 111128888, filed on Aug. 2, 2022. The entirety of the above-mentioned patent application is hereby incorporated by reference herein and made a part of this specification.

BACKGROUND

Technical Field

The disclosure relates to a detection device. In particularly, the disclosure relates to a microfluidic detection device.

Description of Related Art

Microfluidics technology has a relatively large number of applications in conventional biochemical analyses, for example, micro pumps, micro valves, micro filters, micro mixers, micro pipes, and micro sensors, among other devices, which are mostly manufactured on biological chips for sample pretreatment, mixing, transmission, separation, and detection, among other procedures. Performing biomedical testing or analyses by utilizing a microfluidic chip laboratory can reduce experimental errors in manual operations, improve system stability, reduce energy consumption and sample consumption, save manpower and time, and so on.

In general, a microfluidic channel of a microfluidic chip is manufactured on a silicon substrate. Since the silicon substrate includes an opaque material, mirror coating is required on the path of the microfluidic channel to meet the requirements of optical detection. However, in optical detection, the signal strength is likely to be affected by the yield of mirror manufacturing processes and the length of the optical path. In addition, light beams for detection mostly come from external light sources, causing the overall architecture of the microfluidic chip laboratory to be relatively large.

SUMMARY

The disclosure provides a microfluidic detection device, with a relatively thin overall thickness, and a relatively flexible design of optical path for a detection beam.

In an embodiment of the disclosure, a microfluidic detection device includes a circuit substrate and a transparent substrate. The circuit substrate is provided with at least one first light-emitting device, a photodetector, and a control circuit. The at least one first light-emitting device is used to emit a detection beam. The photodetector is used to receive the detection beam and send out a sensing signal. The control circuit is electrically connected to the at least one first light-emitting device and the photodetector. The transparent substrate overlaps the circuit substrate and is provided with a microfluidic channel and a light guide structure. The light guide structure has a light incident surface and a light exiting surface, extends from each of the light incident surface and the light exiting surface to the microfluidic channel, and is adapted to transmit the detection beam into and out of the microfluidic channel. The light incident surface of the light guide structure is disposed corresponding to the at least one first light-emitting device. The light exiting surface of the light guide structure is disposed corresponding to the photodetector.

Based on the foregoing, in the microfluidic detection device of an embodiment of the disclosure, the first light-emitting device and the photodetector are each disposed on the circuit substrate. The light guide structure disposed on the transparent substrate and disposed corresponding to the first light-emitting device and the photodetector can guide the detection beam emitted by the first light-emitting device into the microfluidic channel on the transparent substrate, and transmit the detection beam passing through the microfluidic channel to the photodetector. Accordingly, the optical energy loss of the detection beam on the transmission path can be effectively reduced, and the design flexibility of the optical transmission path can be enhanced. In addition, by integrating the light source and the photodetector of the detection beam on the same circuit substrate, the overall structure of the microfluidic detection device can also be simplified.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The terms "about", "approximately", "essentially", or "substantially" as used herein is inclusive of a stated value and means within an acceptable range of deviation for a particular value as determined by people having ordinary skill in the art, considering the measurement in question and the particular quantity of errors associated with measurement (i.e., the limitations of the measurement system). For example, "about" may mean within one or more standard deviations or within ±30%, ±20%, ±15%, ±10%, or ±5% of the stated value. Furthermore, a relatively acceptable range of deviation or standard deviation may be selected for the term "about", "approximately", "essentially", or "substantially" as used herein based on measurement properties, cutting properties, or other properties, instead of applying one standard deviation across all properties.

In the drawings, thicknesses of layers, films, panels, regions, etc., are exaggerated for the sake of clarity. It should be understood that when an element such as a layer, film, region, or substrate is referred to as being "on", or "connected to" another element, it may be directly on or connected to another element, or intermediate elements may also be present. Comparatively, when an element is referred to as being "directly on" or "directly connected to" another element, no intermediate elements are present. As used herein, the term "connection" may refer to physical and/or electrical connection. Furthermore, "electrical connection" may encompass the presence of other elements between two elements.

Moreover, relative terms such as "lower" or "bottom" and "upper" or "top" may herein serve for describing the relation between one element and another element as shown in the drawings. It should also be understood that the relative terms are intended to include different directions of a device in addition to the direction as shown in the drawings. For example, if a device in the drawings is turned upside down, an element described as being on the "lower" side of another element shall be re-orientated to be on the "upper" side of the another element. Therefore, the exemplary term "lower" may include the orientations of "lower" and "upper", depending on the specific orientation of the drawings. Similarly, if a device in the drawings is turned upside down, an element described to be "below" or "beneath" another element shall be re-orientated to be "above" the another element. Therefore, the exemplary term "above" or "below" may include the orientations of above and below.

Exemplary embodiments are described herein with reference to schematic cross-sectional views illustrating idealized embodiments. Therefore, variations of shapes in the drawings resulting from manufacturing technologies and/or tolerances, for example, are to be expected. Accordingly, the embodiments described herein should not be construed as being limited to the particular shapes of regions as shown herein but including deviations in shapes resulting from manufacturing, for example. For example, regions shown or described as being flat may typically have rough and/or non-linear features. In addition, an acute angle as shown may be round. Therefore, regions as shown in the drawings are schematic in nature, and their shapes are not intended to show the exact shapes of the regions, nor intended to limit the scope of the claims.

Reference will now be made in detail to the exemplary embodiments of the disclosure, examples of which are illustrated in the accompanying drawings. Wherever possible, the same reference numerals are used in the drawings and description to refer to the same or like parts.

Figure 1:
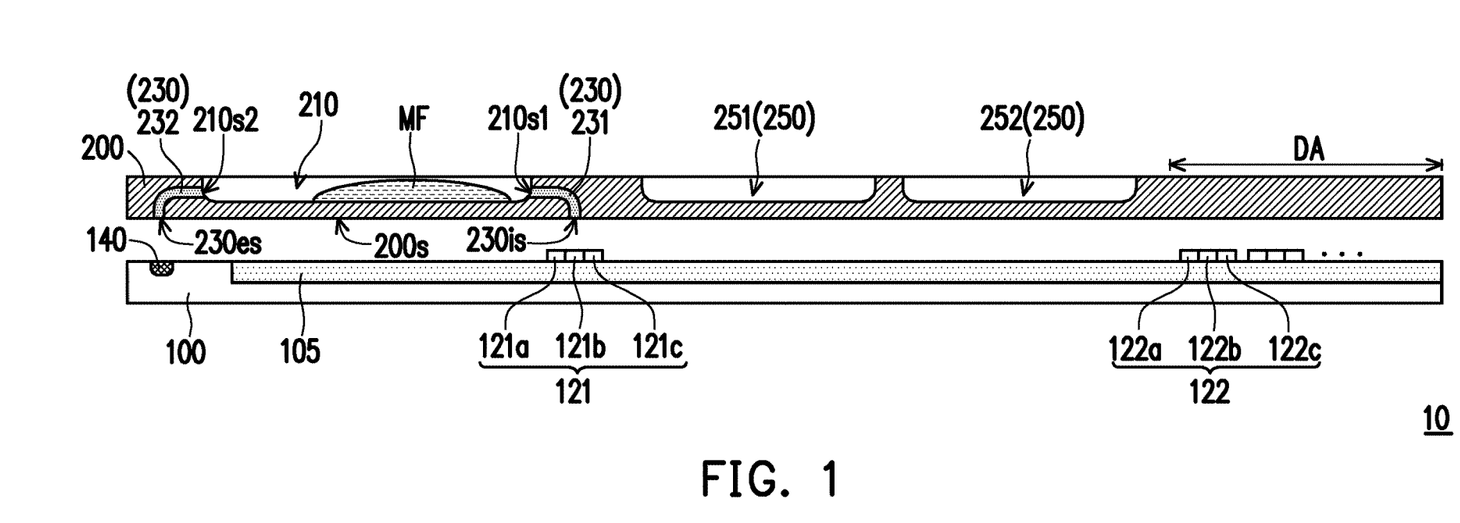
FIG. 1 is a schematic side view of an embodiment of a microfluidic detection device according to the disclosure.
Figure 2:
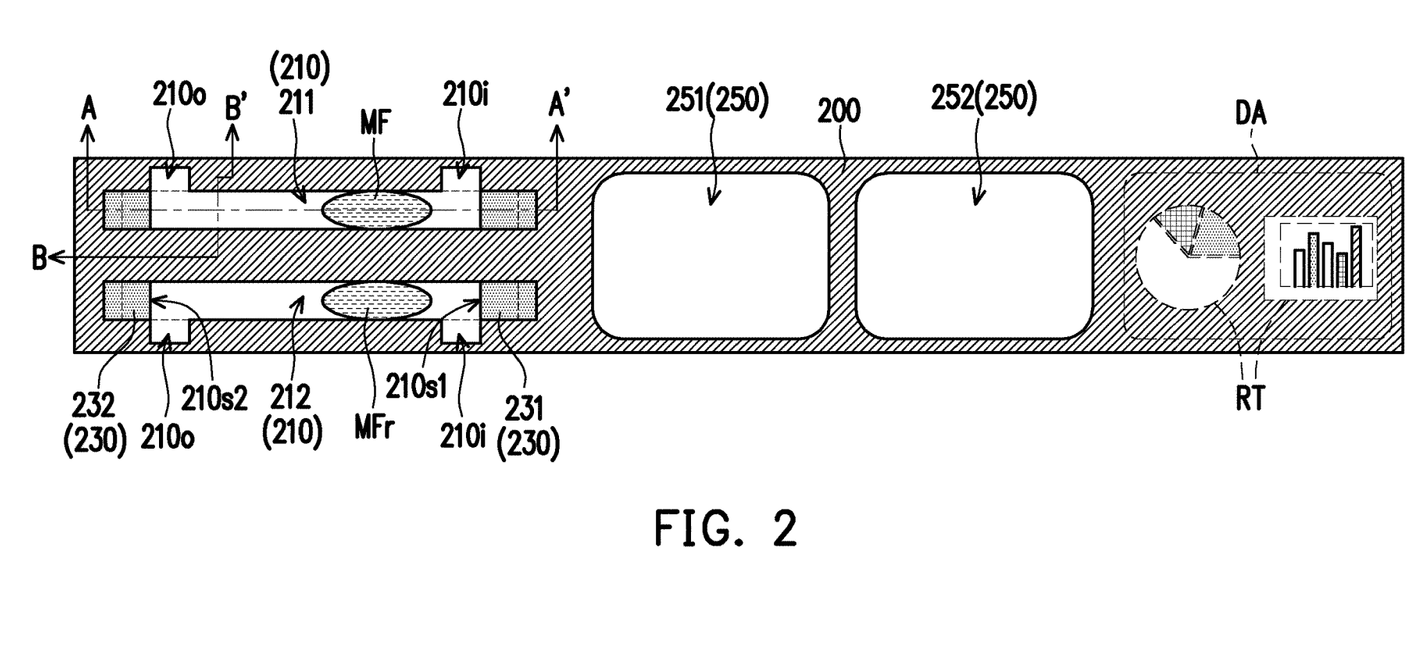
FIG. 2 is a schematic top view of the transparent substrate in FIG. 1.
Figure 3:
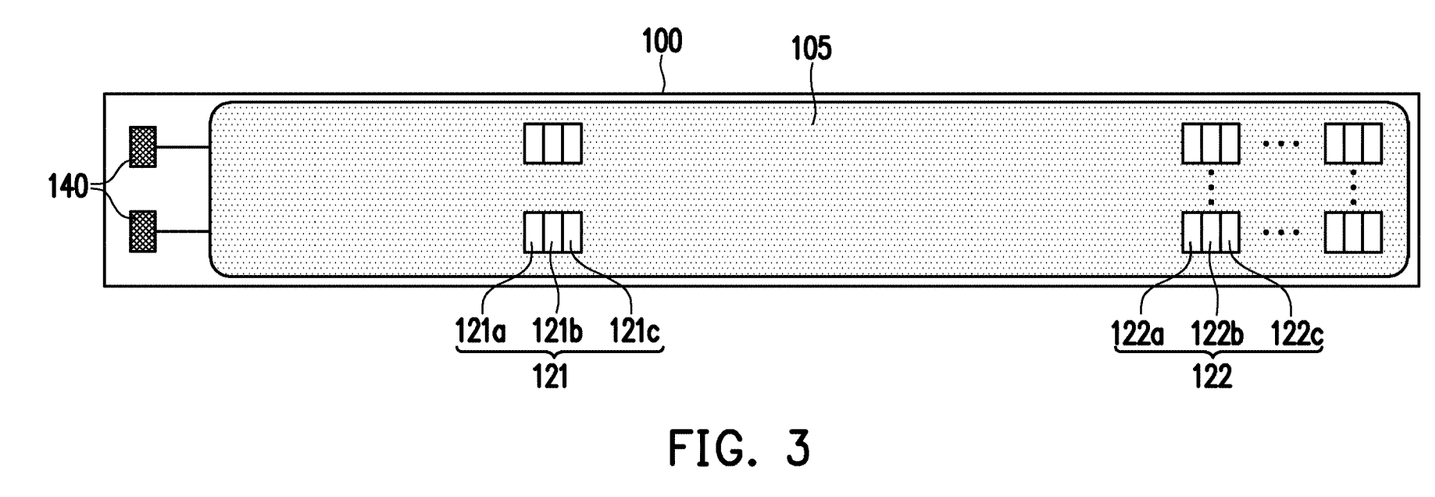
FIG. 3 is a schematic top view of the circuit substrate in FIG. 1.
Figure 4:
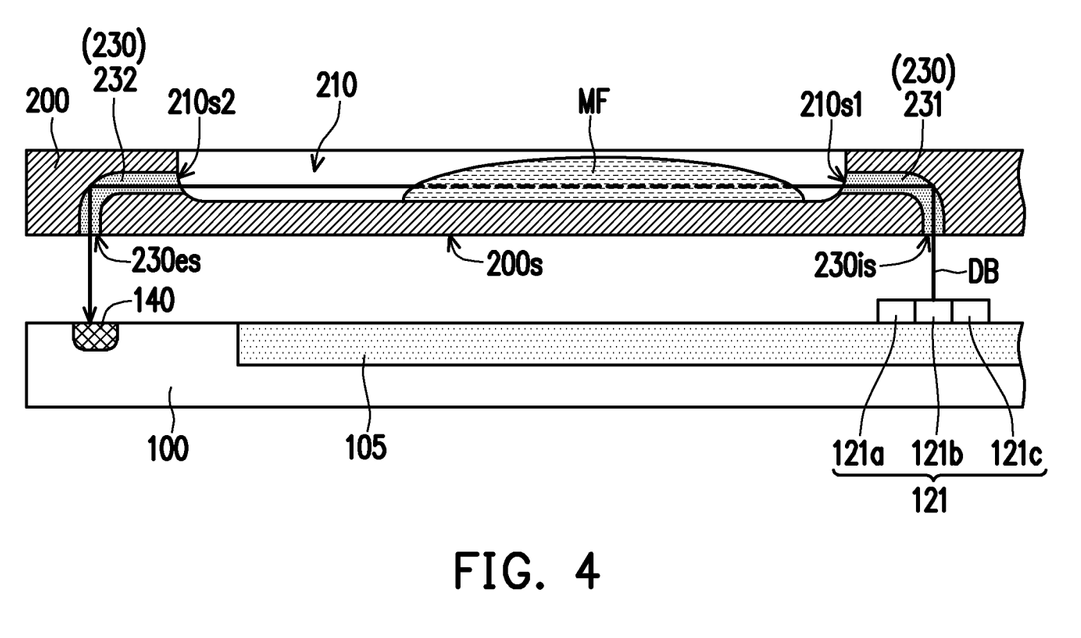
FIG. 4 is a schematic partially enlarged view of the microfluidic detection device in FIG. 1.
Figure 5:
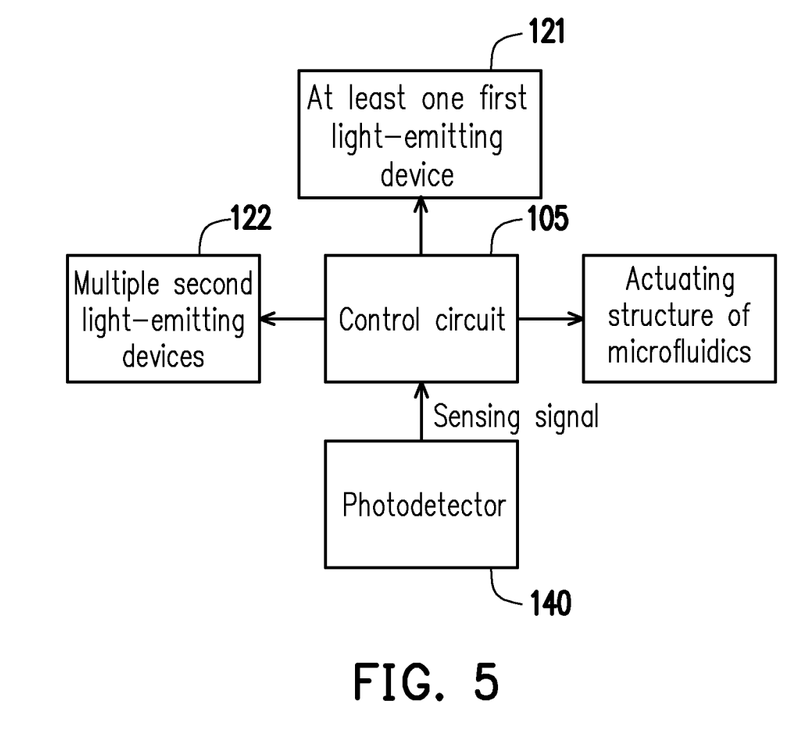
FIG. 5 is a block diagram of the functional architecture of the microfluidic detection device in FIG. 1.
Figure 6A:
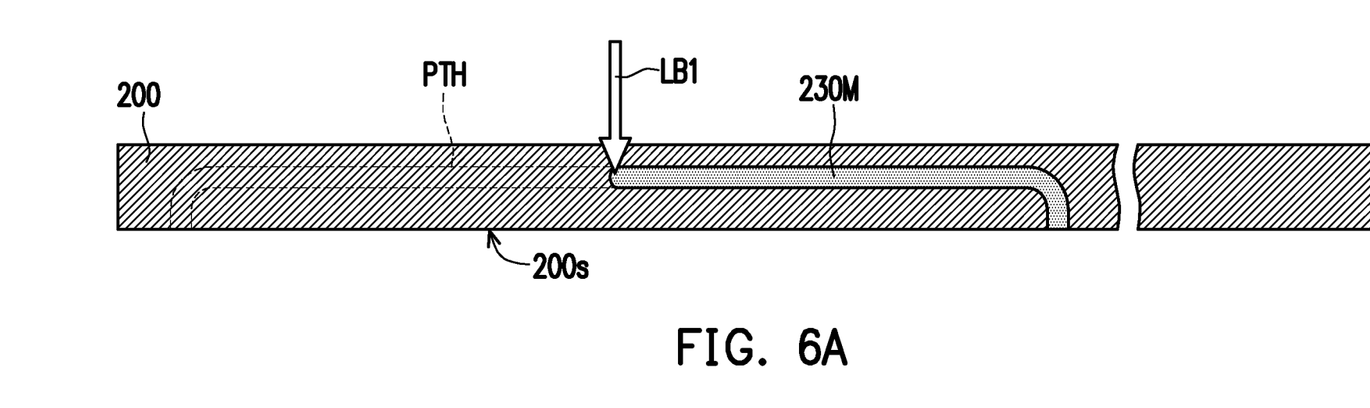
FIG. 6A to FIG. 6D are schematic cross-sectional views of a manufacturing process of the transparent substrate in FIG. 1.

FIG. 1 is a schematic side view of an embodiment of a microfluidic detection device according to the disclosure. FIG. 2 is a schematic top view of the transparent substrate in FIG. 1. FIG. 3 is a schematic top view of the circuit substrate in FIG. 1. FIG. 4 is a schematic partially enlarged view of the microfluidic detection device in FIG. 1. FIG. 5 is a block diagram of the functional architecture of the microfluidic detection device in FIG. 1. FIG. 6A to FIG. 6D are schematic cross-sectional views of a manufacturing process of the transparent substrate in FIG. 1. FIG. 6D is a schematic cross-sectional view of the transparent substrate 200 taken along section line A-A' and section line B-B' in FIG. 2.

With reference to FIG. 1 to FIG. 3, a microfluidic detection device 10 includes a circuit substrate 100 and a transparent substrate 200. The circuit substrate 100 overlaps the transparent substrate 200. The circuit substrate 100 is provided with a control circuit 105, a first light-emitting device 121, and a photodetector 140 on the circuit substrate 100. The control circuit 105 is electrically connected to the first light-emitting device 121 and the photodetector 140. In this embodiment, the control circuit 105 is, for example, a complementary metal-oxide semiconductor (CMOS) circuit, and includes a plurality of circuit blocks with different functions. The first light-emitting device 121 may be electrically connected to a first circuit block (not shown) of the control circuit 105, and the photodetector 140 may be electrically connected to a second circuit block (not shown) of the control circuit 105. Nonetheless, the disclosure is not limited thereto. In other words, the control circuit 105 is adapted to control the first light-emitting device 121 to emit light and receive a sensing signal from the photodetector 140 (as shown in FIG. 5).

In this embodiment, the first light-emitting device 121 is, for example, a micro light-emitting diode (micro-LED) or an organic light-emitting diode (OLED), and may include a plurality of first light-emitting devices (e.g., a first light-emitting device 121$a$, a first light-emitting device 121$b$, and a first light-emitting device 121$c$) that are adapted to emit light of different colors or fluorescent light, but not limited thereto. In addition, the photodetector 140 is, for example, a photodiode, and may be manufactured by a CMOS process. In other words, in this embodiment, the photodetector 140 and the control circuit 105 may be integrated on the same semiconductor substrate.

In addition, the transparent substrate 200 is provided with a microfluidic channel 210 and a light guide structure 230. The light guide structure 230 extends from a substrate surface 200$s$ of the transparent substrate 200 facing the circuit substrate 100 to the microfluidic channel 210. More specifically, the light guide structure 230 has a light incident surface 230$is$ that is disposed corresponding to the first light-emitting device 121 and a light exiting surface 230$es$ that is disposed corresponding to the photodetector 140, and extends from each of the light incident surface 230$is$ and the light exiting surface 230$es$ to the microfluidic channel 210. A material of the transparent substrate 200 includes glass, polycarbonate (PC), polymethylmethacrylate (PMMA), a cyclo olefin polymer (COP), or other organic or inorganic substrate materials adapted for laser beams to be transmitted into.

In this embodiment, the microfluidic channel 210 has a first end surface 210$s1$ and a second end surface 210$s2$ facing each other. The light guide structure 230 includes a first waveguide 231 and a second waveguide 232. The first waveguide 231 extends in a bent manner from the substrate surface 200$s$ to the first end surface 210$s1$ of the microfluidic channel 210. The second waveguide 232 extends in a bent manner from the substrate surface 200$s$ to the second end surface 210$s2$ of the microfluidic channel 210. It should be noted that the surface of the first waveguide 231 that is coplanar with the substrate surface 200$s$ may be defined as the light incident surface 230$is$ of the light guide structure 230, and the surface of the second waveguide 232 that is coplanar with the substrate surface 200$s$ may be defined as the light exiting surface 230$es$ of the light guide plate 230.

With reference to FIG. 4, the first light-emitting device 121 on the circuit substrate 100 may be used to emit a detection beam DB. Since the light incident surface 230$is$ of the light guide structure 230 on the transparent substrate 200 overlaps the first light-emitting device 121, the detection beam DB emitted by the first light-emitting device 121 may enter the first waveguide 231 of the light guide structure 230 from the light incident surface 230$is$ of the light guide structure 230. In this embodiment, a refractive index of the light guide structure 230 is greater than a refractive index of the transparent substrate 200. Accordingly, after entering the first waveguide 231, the detection beam DB may be restricted by the total reflection at the junction between the first waveguide 231 and the transparent substrate 200 to being transmitted in the first waveguide 231 and being incident to the first end surface 210s1 of the microfluidic channel 210.

The microfluidic channel 210 is adapted for placing microfluidics MF therein. The microfluidics MF are, for example, blood, biological samples, or chemical reagents, but not limited thereto. After passing through the microfluidics MF, the detection beam DB incident to the microfluidic channel 210 enters the second waveguide 232 of the light guide structure 230 from the second end surface 210s2 of the microfluidic channel 210. The detection beam DB may be restricted by the total reflection at the junction between the second waveguide 232 and the transparent substrate 200 to being transmitted in the second waveguide 232 and exiting from the light exiting surface 230es of the light guide structure 230. Since the light exiting surface 230es of the light guide structure 230 on the transparent substrate 200 overlaps the photodetector 140, the photodetector 140 is adapted to receive the detection beam DB from the second waveguide 232 and send out a sensing signal.

Since the first light-emitting device 121 (i.e., a detection light source) that emits the detection beam DB and the photodetector 140 are integrated on the same circuit substrate 100, the overall structure of the microfluidic detection device 10 may be simplified. In addition, in this embodiment, since the light guide structure 230 transmits the detection beam DB by utilizing the features of waveguide, optical energy loss of the detection beam DB is relatively unlikely. Accordingly, the design flexibility of the optical transmission path on the transparent substrate 200 is relatively great.

In particular, in this embodiment, the transparent substrate 200 may also be provided with a display area DA, as shown in FIG. 1, FIG. 2, and FIG. 3. The circuit substrate 100 may also be provided with a plurality of second light-emitting devices 122, and the second light-emitting devices 122 overlap the display area DA of the transparent substrate 200. The second light-emitting devices 122 are, for example, micro light-emitting diodes (micro-LEDs) or organic light-emitting diodes (OLEDs). For example, the circuit substrate 100 may be provided with a second light-emitting device 122a, a second light-emitting device 122b, and a second light-emitting device 122c that respectively emit light of different colors (e.g., red light, green light, and blue light) in the display area DA. In this embodiment, the second light-emitting device 122a, the second light-emitting device 122b, and the second light-emitting device 122c may form a display pixel.

As shown in FIG. 5, the second light-emitting devices 122 may be electrically connected to a third circuit block (not shown) of the control circuit 105. More specifically, the control circuit 105 is also adapted to control the second light-emitting devices 122 to emit light to display a process result RT of the sensing signal from the photodetector 140 (as shown in FIG. 2).

A manufacturing process of the transparent substrate 200 will be exemplarily described below. With reference to FIG. 6A, first, a laser beam LB1 is utilized to irradiate the corresponding portion of the transparent substrate 200 along a predetermined irradiation path PTH, and the irradiation path PTH extends in a bent manner from a part of the substrate surface 200s to another part of the substrate surface 200s of the transparent substrate 200. In particular, during the irradiation process of the laser beam LB1, the material of the transparent substrate 200 may be modified. For example, the refractive index may be changed. More specifically, after the irradiation of the laser beam LB1, the refractive index of a portion 230M of the transparent substrate 200 located on the irradiation path PTH of the laser beam LB1 may be increased.

In other words, the refractive index of the portion 230M of the transparent substrate 200 irradiated by the laser beam LB1 is greater than the refractive index of the portion of the transparent substrate 200 not irradiated by the laser beam LB1 (i.e., the refractive index of the transparent substrate 200). With a relatively large refractive index, the portion 230M of the transparent substrate 200 irradiated by the laser beam LB1 may serve as a waveguide structure.

Figure 6B:
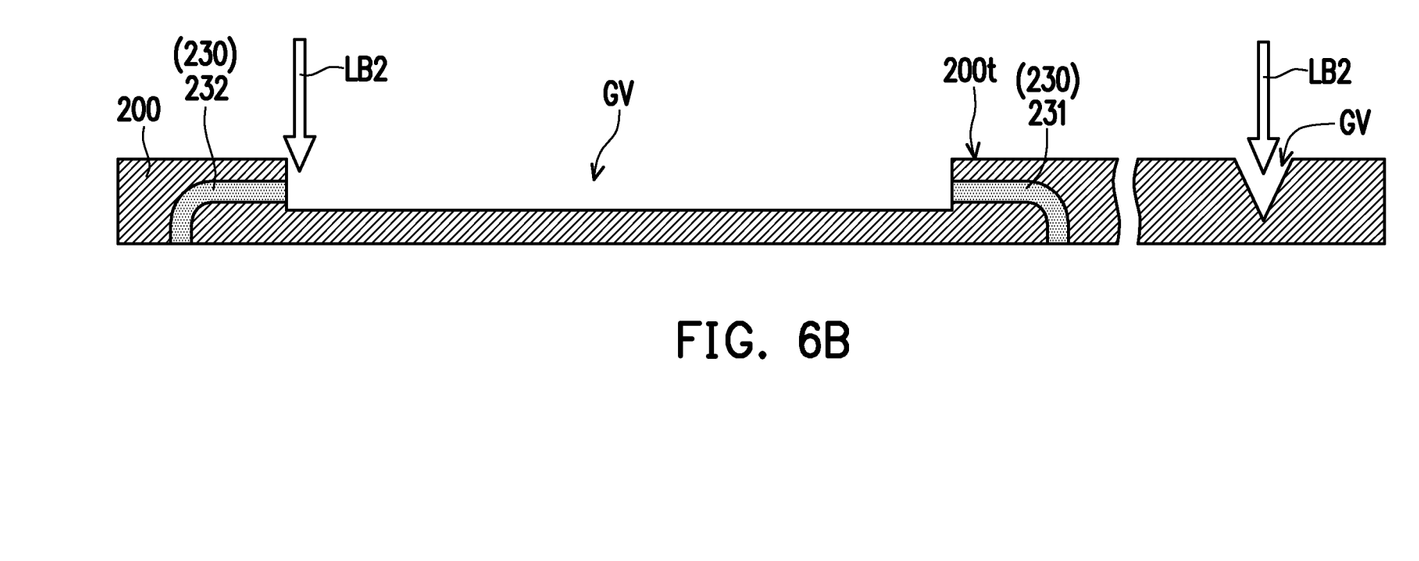

As shown in FIG. 6B, the irradiation process of another laser beam LB2 is performed to remove a portion of the transparent substrate 200 and form a micro-groove GV on a substrate surface 200t at another side. It is particularly noted that the formation of the micro-groove GV may divide the previously formed waveguide structure into two. More specifically, the micro-groove GV cuts the portion 230M of the transparent substrate 200 irradiated by the laser beam LB1 into the first waveguide 231 and the second waveguide 232 separated from each other.

Figure 6C:
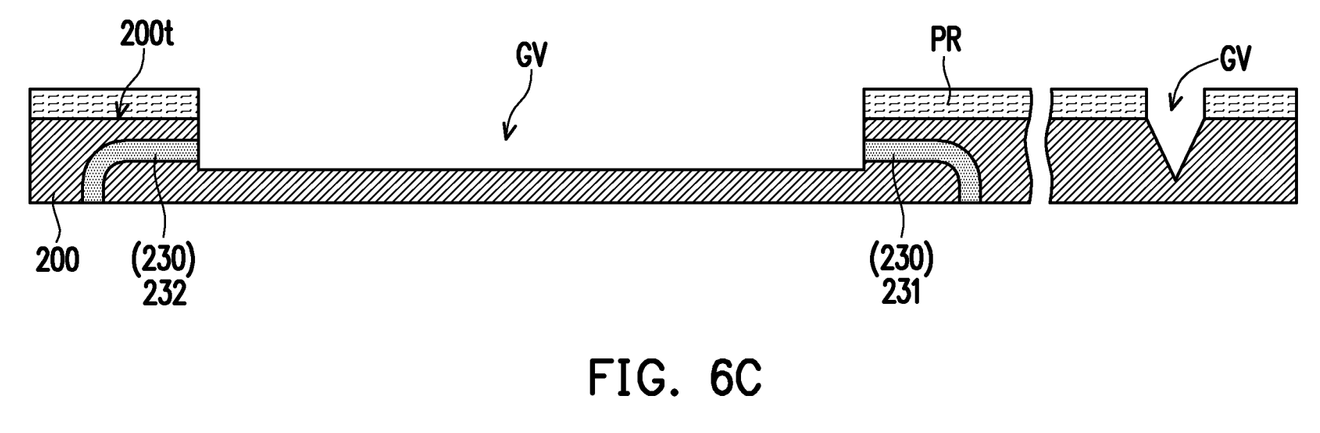
Figure 6D:
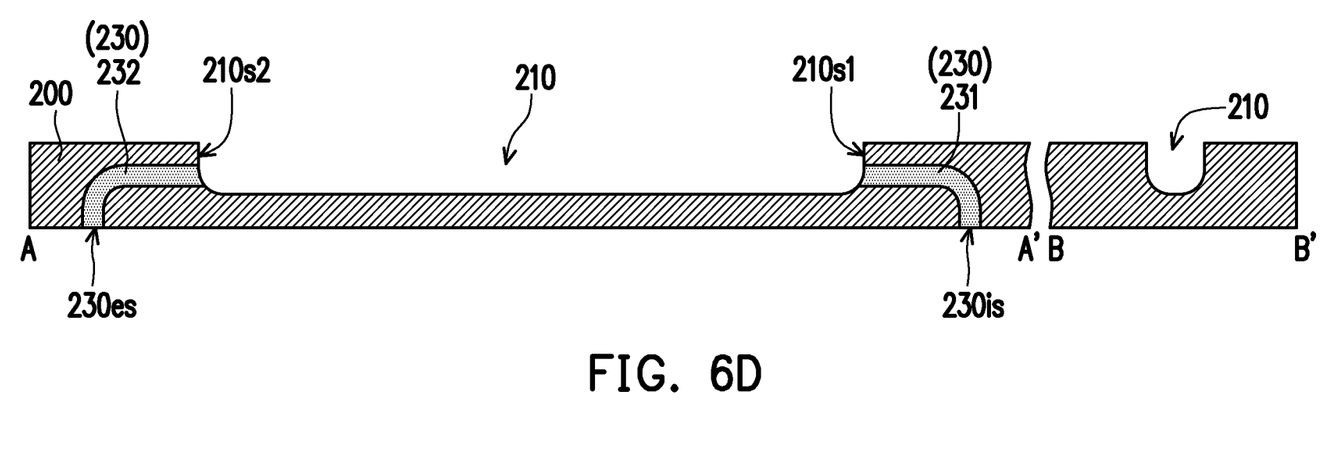

After the step of forming the micro-groove GV is completed, a wet etching process is performed to further increase the volume of the micro-groove GV and form the microfluidic channel 210, as shown in FIG. 6C and FIG. 6D. For example, the wet etching process may include: forming a patterned photoresist layer PR on the substrate surface 200t of the transparent substrate 200 by utilizing a mask and an exposure light source, and etching a portion of the transparent substrate 200 not covered by the photoresist layer PR by utilizing an etching solution, but not limited thereto. At this point, the manufacturing of the transparent substrate 200 of this embodiment is completed.

In this embodiment, the first waveguide 231 and the second waveguide 232 (i.e., the light guide structure 230) are formed by utilizing the laser beam LB1 to irradiate and modify a portion of the transparent substrate 200. Accordingly, compared with the conventional formation of the transmission path of the detection beam by utilizing a mirror manufacturing process, the manufacturing the light guide structure 230 in the embodiments of disclosure not only has a relatively slight influence on the detection beam, but also enhances the design flexibility of the optical transmission path.

With reference to FIG. 1 and FIG. 2, in this embodiment, the microfluidic channel 210 is provided with an injection port 210i at one side (e.g., the side of the first end surface 210s1), and provided with an output port 210o at another side (e.g., the side of the second end surface 210s2). The microfluidics MF enter the microfluidic channel 210 through the injection port 210i, and leaves the microfluidic channel 210 through the output port 210o. In this embodiment, the microfluidic channel 210 on the transparent substrate 200 may include two microfluidic channels, a microfluidic channel 211 and a microfluidic channel 212, respectively. For example, the microfluidic channel 211 is adapted for injecting microfluidics MF to be tested, and the microfluidic channel 212 is adapted for injecting control microfluidics MF, but not limited thereto. It should be understood that, the number of microfluidic channels 210 on the transparent substrate 200 and the numbers of photodetectors 140 and first light-emitting devices 121 corresponding to the microfluidic channels 210 may be adjusted depending on the actual requirements, which are not limited by the disclosure.

In addition, the transparent substrate 200 may optionally be provided with a microcavity 250 in communication with the microfluidic channel 210. In this embodiment, the microcavity 250 of the transparent substrate 200 may include two microcavities, for example, a microcavity 251 and a microcavity 252, respectively. For example, the microcavity 251 is adapted for mixing, diluting, or reacting various solutions, and the microcavity 252 is adapted for extracting or separating sample solutions, but not limited thereto. In particular, the step of forming the microcavity 250 may be integrated in the manufacturing process of the microfluidic channel 210. In other words, the microcavity 250 and the microfluidic channel 210 may be formed at the same time in the manufacturing process.

Further, the transparent substrate 200 may also be provided with an actuating structure (not shown) of the microfluidics MF. For example, in this embodiment, the movement of the microfluidics MF may be controlled by utilizing the mechanism of electroosmotic flow. In other words, the actuating structure of the microfluidics MF may be a patterned electrode structure, but not limited thereto. In other embodiments, the movement of the microfluidics MF may also be controlled by utilizing the laminar flow generated during flow of the microfluidics MF in micron-scale flow channels. In this embodiment, the actuating structure of the microfluidics MF may also be electrically connected to a fourth circuit block (not shown) of the control circuit 105. In other words, the control circuit 105 is also adapted to control the microfluidics MF to move in the microfluidic channel 210 (as shown in FIG. 5), but not limited thereto.

In summary of the foregoing, in the microfluidic detection device of an embodiment of the disclosure, the first light-emitting device and the photodetector are each disposed on the circuit substrate. The light guide structure disposed on the transparent substrate and disposed corresponding to the first light-emitting device and the photodetector may guide the detection beam emitted by the first light-emitting device into the microfluidic channel on the transparent substrate, and transmit the detection beam passing through the microfluidic channel to the photodetector. Accordingly, the optical energy loss of the detection beam on the transmission path can be effectively reduced, and the design flexibility of the optical transmission path can be enhanced. In addition, by integrating the light source and the photodetector of the detection beam on the same circuit substrate, the overall structure of the microfluidic detection device can also be simplified.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A microfluidic detection device comprising:
   a circuit substrate provided with:
      at least one first light-emitting device used to emit a detection beam;
      a photodetector used to receive the detection beam and send out a sensing signal; and
      a control circuit electrically connected to the at least one first light-emitting device and the photodetector; and
   a transparent substrate overlapping the circuit substrate and being provided with:
      a microfluidic channel; and
      a light guide structure having a light incident surface and a light exiting surface, the light guide structure is surrounded by the transparent substrate, the light guide structure extending from each of the light incident surface to the microfluidic channel, and the light guide structure extending from the light exiting surface to the microfluidic channel, and the light guide structure adapted to transmit the detection beam into and out of the microfluidic channel, wherein the light incident surface of the light guide structure is disposed corresponding to the at least one first light-emitting device, and the light exiting surface of the light guide structure is disposed corresponding to the photodetector.

2. The microfluidic detection device according to claim 1, wherein the transparent substrate is further provided with a display area, the circuit substrate is further provided with a plurality of second light-emitting devices, and the second light-emitting devices overlap the display area.

3. The microfluidic detection device according to claim 2, wherein the control circuit is further adapted to control the second light-emitting devices to emit light to display a process result of the sensing signal from the photodetector.

4. The microfluidic detection device according to claim 1, wherein a refractive index of the light guide structure is greater than a refractive index of the transparent substrate.

5. The microfluidic detection device according to claim 1, wherein the control circuit is adapted to control microfluidics to move in the microfluidic channel.

6. The microfluidic detection device according to claim 5, wherein the control circuit is further adapted to receive the sensing signal from the photodetector.

7. The microfluidic detection device according to claim 1, wherein the transparent substrate is further provided with at least one microcavity in communication with the microfluidic channel.

8. The microfluidic detection device according to claim 1, wherein a material of the transparent substrate comprises glass, polycarbonate, polymethylmethacrylate, or a cyclo olefin polymer.

9. The microfluidic detection device according to claim 1, wherein the microfluidic channel has a first end surface and a second end surface facing each other, the transparent substrate has a substrate surface facing the circuit substrate, the light guide structure comprises a first waveguide and a second waveguide, the first waveguide extends in a bent manner from the substrate surface to the first end surface of the microfluidic channel, and the second waveguide extends in a bent manner from the substrate surface to the second end surface of the microfluidic channel.

10. The microfluidic detection device according to claim 1, wherein the transparent substrate has a substrate surface facing the circuit substrate, and the substrate surface is coplanar with the light incident surface and the light exiting surface of the light guide structure.

11. The microfluidic detection device according to claim 1, wherein the at least one first light-emitting device comprises a plurality of first light-emitting devices, and the first light-emitting devices are adapted to emit light of different colors or fluorescent light.

* * * * *